US010987746B2

United States Patent
Sakaguchi

(10) Patent No.: US 10,987,746 B2
(45) Date of Patent: Apr. 27, 2021

(54) WIRE ELECTRIC DISCHARGE MACHINING APPARATUS

(71) Applicant: Sodick Co., Ltd., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 260 days.

(21) Appl. No.: 16/244,120

(22) Filed: Jan. 10, 2019

(65) Prior Publication Data

US 2019/0255638 A1 Aug. 22, 2019

(30) Foreign Application Priority Data

Feb. 22, 2018 (JP) .............................. JP2018-029865

(51) Int. Cl.
| | | |
|---|---|---|
| *B23H 11/00* | (2006.01) | |
| *B23H 7/10* | (2006.01) | |
| *B23H 7/34* | (2006.01) | |
| *B23H 7/06* | (2006.01) | |

(52) U.S. Cl.
CPC .............. *B23H 11/00* (2013.01); *B23H 7/06* (2013.01); *B23H 7/105* (2013.01); *B23H 7/34* (2013.01)

(58) Field of Classification Search
CPC .......... B23H 7/105; B23H 7/10; B23H 11/00; B23H 7/34; B23H 7/06
See application file for complete search history.

(56) References Cited

U.S. PATENT DOCUMENTS 5,164,563 A * 11/1992 Aso .......................... B23H 7/02
219/69.12

FOREIGN PATENT DOCUMENTS

| EP | 0464219 | 1/1992 |
|---|---|---|
| JP | S58027022 | 2/1983 |
| JP | 01109026 A * | 4/1989 |
| JP | H01163028 | 11/1989 |
| JP | 02311219 A * | 12/1990 |
| JP | 2002001618 | 1/2002 |
| JP | 5827022 | 12/2015 |
| JP | 5913751 | 4/2016 |

OTHER PUBLICATIONS

Machine translation of Japan Patent document No. 02311219A, published Nov. 2020.*
Office Action of China Counterpart Application, with English translation thereof, dated Mar. 30, 2020, pp. 1-16.

* cited by examiner

*Primary Examiner* — Geoffrey S Evans
(74) *Attorney, Agent, or Firm* — JCIPRNET

(57) ABSTRACT

A wire electric discharge machining apparatus includes upper and lower wire guide units including wire guides configured to position and guide a wire electrode and a jet nozzle configured to supply a jet flow coaxially with the wire electrode, and a core holding pad having a through-hole passing therethrough in an upward/downward direction, and in which a plurality of protrusion sections having an equal distance from upper surfaces thereof to a lower surface of the workpiece are formed. The core holding pad is disposed on the lower wire guide unit such that the core holding pad approaches the lower surface of the workpiece as closely as possible.

9 Claims, 7 Drawing Sheets

WIRE ELECTRIC DISCHARGE MACHINING APPARATUS

CROSS-REFERENCE TO RELATED APPLICATION

This application claims the priority benefit of Japan application serial no. 2018-029865, filed on Feb. 22, 2018. The entirety of the above-mentioned patent application is hereby incorporated by reference herein and made a part of this specification.

BACKGROUND

Technical Field

The disclosure relates to a wire electric discharge machining apparatus for cutting-out a core from a workpiece through wire electric discharge machining.

Description of Related Art

In the related art, as an apparatus for applying a desired jet pressure to a core when the core is cut out from a workpiece through wire electric discharge machining or after cutting-out, a wire electric discharge machining apparatus disclosed in Patent Document 1 (Japanese Laid-open No. 58-27022) is provided. In the wire electric discharge machining apparatus, when the core is cut out, a jet flow having a desired pressure is injected from a nozzle port installed in a lower wire guide section, and machining chips generated in a machining gap between a workpiece and a core are removed during the wire electric discharge machining. In addition, after the core is cut out, a jet flow is injected to the core cut out from the workpiece, and the core is pushed upward by the jet pressure such that it is separated from the workpiece.

However, in the wire electric discharge machining apparatus disclosed in Patent Document 1, a core may be separated and fall out from a workpiece after cutting-out, and a lower wire guide unit disposed immediately under the workpiece may be damaged.

SUMMARY

In consideration of the above-mentioned problems, an objective of the disclosure is mainly directed to providing a wire electric discharge machining apparatus capable of preventing damage to a lower wire guide unit due to falling of a core and applying a desired jet pressure during and after cutting-out using a relatively simple configuration.

A wire electric discharge machining apparatus of a first disclosure is a wire electric discharge machining apparatus for pushing up a core cut out of a workpiece through wire electric discharge machining using a jet pressure of a jet flow and separating the core from the workpiece, the wire electric discharge machining apparatus including: an upper wire guide unit and a lower wire guide unit including wire guides installed above and below with the workpiece sandwiched therebetween and configured to position and guide a wire electrode, and a jet nozzle being configured to supply a jet flow of a working fluid coaxially with the wire electrode; and a core holding pad having a through-hole passing therethrough in an upward/downward direction, and in which a plurality of protrusion sections having an equal distance from upper surfaces thereof to a lower surface of the workpiece are formed, wherein the core holding pad is disposed on the lower wire guide unit such that the jet nozzle is disposed in the through-hole and the core holding pad approaches the lower surface of the workpiece as closely as possible to hold a lower surface of the core cut out of the workpiece, and a working fluid injected during cutting-out and after cutting-out is discharged from gaps between the plurality of protrusion sections connected to the through-hole.

DESCRIPTION OF THE EMBODIMENTS

Figure 1:
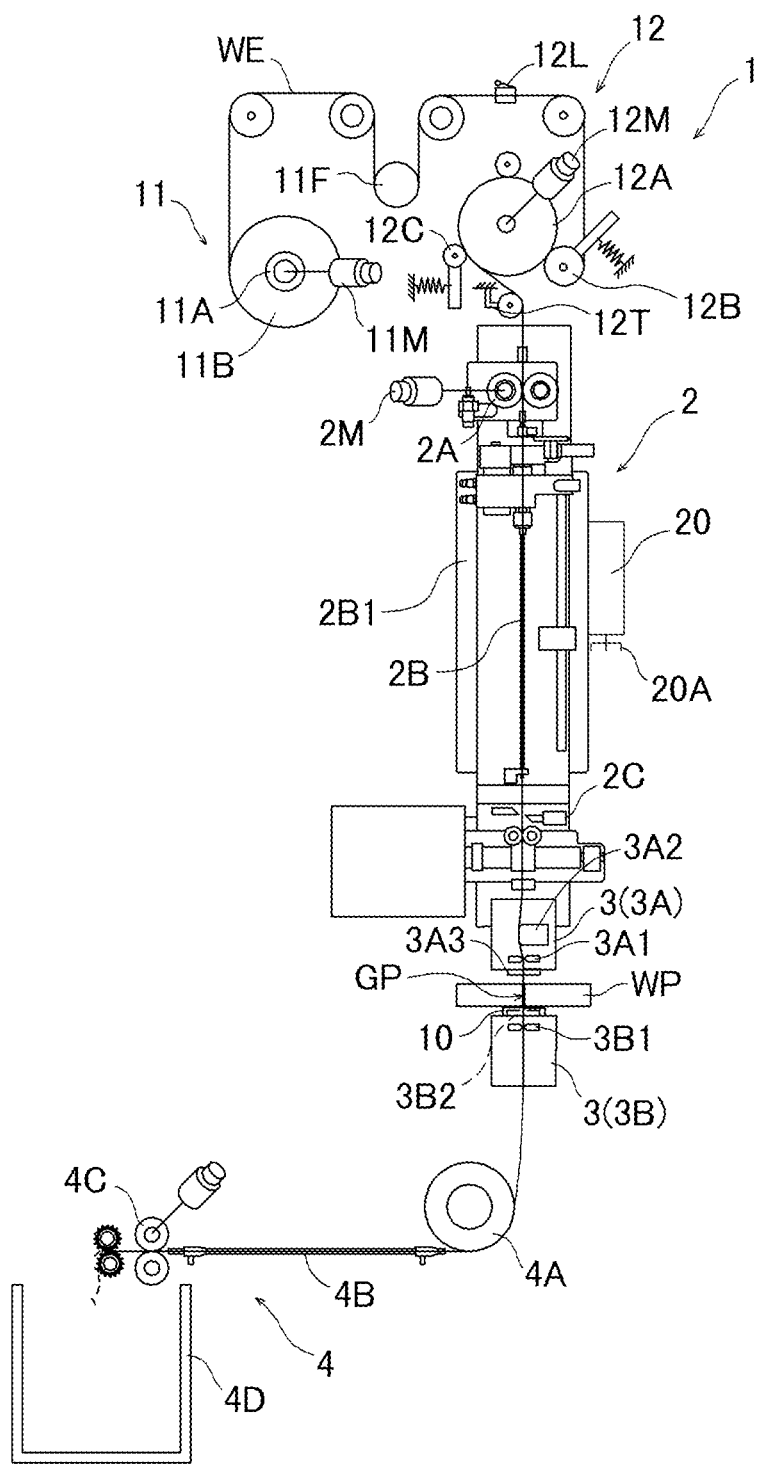
FIG. 1 is a schematic view of a wire electric discharge machining apparatus according to an embodiment.

A wire electric discharge machining apparatus of a first disclosure is a wire electric discharge machining apparatus for pushing up a core cut out of a workpiece through wire electric discharge machining using a jet pressure of a jet flow and separating the core from the workpiece, the wire electric discharge machining apparatus including: an upper wire guide unit and a lower wire guide unit including wire guides installed above and below with the workpiece sandwiched therebetween and configured to position and guide a wire electrode, and a jet nozzle being configured to supply a jet flow of a working fluid coaxially with the wire electrode; and a core holding pad having a through-hole passing therethrough in an upward/downward direction, and in which a plurality of protrusion sections having an equal distance from upper surfaces thereof to a lower surface of the workpiece are formed, wherein the core holding pad is disposed on the lower wire guide unit such that the jet nozzle is disposed in the through-hole and the core holding pad approaches the lower surface of the workpiece as closely as possible to hold a lower surface of the core cut out of the workpiece, and a working fluid injected during cutting-out and after cutting-out is discharged from gaps between the plurality of protrusion sections connected to the through-hole.

In the disclosure, the core holding pad having a through-hole passing therethrough in an upward/downward direction, and in which a plurality of protrusion sections having an equal distance from upper surfaces thereof to a lower surface of the workpiece are formed, is installed on the lower wire guide unit such that the jet nozzle is disposed in the through-hole, and is disposed to approach the lower surface of the workpiece as closely as possible to hold the lower surface of the core cut out of the workpiece. Accordingly, the core after cutting-out can be held by the core holding pad. Accordingly, damage to the lower wire guide unit due to falling of the core can be prevented using this core holding pad having a simple configuration.

In addition, the working fluid injected during cutting-out and after cutting-out is discharged from the gaps between the plurality of protrusion sections connected to the through-hole. Accordingly, since there is no need to install a driving apparatus that can easily malfunction in the working fluid, an excessive increase in jet pressure in a space of the through-hole having an upper side closed by the workpiece and the core can be prevented using a relatively simple configuration and the jet pressure can be adjusted to have an appropriate value. Accordingly, since a jet flow having a desired pressure can be sent to the machining gap between the workpiece and the core during cutting-out of the core, it is possible to prevent occurrence of a problem such as vibration of the wire electrode due to an excessive increase in jet pressure or handling of the machining chip not being possible due to an excessive decrease in jet pressure, and accurately perform cutting-out of the core. Further, since a desired jet pressure can be applied to the core after cutting-out of the core, the core can be pushed out and separated from the workpiece.

In the wire electric discharge machining apparatus of the second disclosure, according to the first disclosure, an upper surface of the core holding pad may be disposed immediately below a center of gravity of the core during cutting-out and after cutting-out of the core.

In the disclosure, during cutting-out and after cutting-out of the core, the upper surface of the core holding pad is disposed immediately below a center of gravity of the core. Accordingly, after the cutting-out, the core can be securely held by the core holding pad, and falling of the core can be prevented. Further, since the core can be held by the upper surface of the core holding pad that is a horizontal plane during the cutting-out and after the cutting-out, inclination of the core can be prevented. Accordingly, it is possible to prevent the core from getting caught on the inner wall of the workpiece and smoothly separate the core from the workpiece after cutting-out.

In the wire electric discharge machining apparatus of a third disclosure, according to the first or second disclosure, after the core is cut out, the lower wire guide unit may inject a working fluid from the jet nozzle toward a center of gravity of the core, and push the core out of the workpiece to separate them.

In the disclosure, after the core is cut out, the lower wire guide unit injects a working fluid from the jet nozzle toward a center of gravity of the core, and pushes the core out of the workpiece to separate them. Accordingly, occurrence of inclination according to a deviation of the jet pressure can be prevented.

In the wire electric discharge machining apparatus of a fourth disclosure, according to the first or second disclosure, an upper surface of the core holding pad may be disposed at a position higher than a height of an upper end of the jet nozzle.

In the disclosure, the upper surface of the core holding pad is disposed at a position higher than a height of the upper end of the jet nozzle. Accordingly, the core can be securely held by the core holding pad. Accordingly, a contact of the jet nozzle with the workpiece and the core during cutting-out can be prevented, and damage to the jet nozzle can be prevented. In addition, damage to the jet nozzle due to falling of the core after cutting-out can be prevented.

In the wire electric discharge machining apparatus of a fifth disclosure, according to the first or second disclosure, the plurality of protrusion sections may include suction nozzles, and when the core falls out upon termination of cutting-out of the core, the plurality of protrusion sections may suction a lower surface of the core and fix the core holding pad and the core.

In the disclosure, the plurality of protrusion sections include suction nozzles, and when the core falls out upon termination of cutting-out of the core, the plurality of protrusion sections suction a lower surface of the core and fix the core holding pad and the core. Accordingly, a deviation of a relative position between the core and the core holding pad can be prevented. Accordingly, in comparison with the case in which only the lower surface of the core is held, the lower surface of the core can be more securely horizontally held. Accordingly, inclination of the core generated when the core falls out from the workpiece can be securely prevented.

In the wire electric discharge machining apparatus of a sixth disclosure, according to the fifth disclosure, the core holding pad may have a sliding mechanism that is relatively movable with respect to the lower wire guide unit in a horizontal direction.

In the disclosure, the core holding pad has the sliding mechanism that is relatively movable with respect to the lower wire guide unit in the horizontal direction. Accordingly, when the core falls out, the core holding pad and the workpiece can be moved with respect to the upper wire guide unit and the lower wire guide unit, through which the wire electrode is inserted, in a horizontal direction while suctioning the core using the suction nozzle and firmly fixing the relative position between the core and the workpiece. Accordingly, it is possible to prevent occurrence of a problem such as insertion of the wire electrode into a machining gap due to movement of the core with respect to the workpiece in the horizontal direction and the wire electrode not advancing or disconnection of the wire electrode, and the core can be cut off by advancing the wire electrode.

The wire electric discharge machining apparatus of a seventh disclosure, according to the fifth disclosure, may further include the core holding pad installed on the upper wire guide unit, wherein, when the core falls out, the plurality of protrusion sections formed on the core holding pad installed on the upper wire guide unit suction the upper surface of the core and fix the core holding pad and the core.

In the disclosure, the core holding pad installed on the upper wire guide unit is further provided, and when the core falls out, the plurality of protrusion sections formed on the core holding pad installed on the upper wire guide unit suction the upper surface of the core and fix the core holding pad and the core. Accordingly, since the core is sandwiched and fixed between the core holding pads disposed on upper and lower sides from above and below, a deviation of a relative position between the core and the core holding pad can be securely prevented. Accordingly, in comparison with the case in which the core is fixed to the lower surface side only, inclination of the core when the core falls out from the workpiece can be more securely prevented.

According to the disclosure, it is possible to apply a desired jet pressure during cutting-out and after cutting-out while preventing damage to a lower wire guide unit due to falling of the core and stably holding the core using a relatively simple configuration.

FIG. 1 is a schematic view showing the entirety of a wire electric discharge machining apparatus of the disclosure. FIG. 1 shows a supply side of a wire electrode seen as a front view of a machine main body and a collection side of the wire electrode seen as a left side view of the machine main body in order to show the entire traveling route of the wire electrode in one drawing. In addition, in FIG. 1, it should be noted that, in order to easily understand a plurality of components, relative sizes and positional relations of the plurality of component are different from actual ones.

First, the entire configuration of the wire electric discharge machining apparatus of the embodiment shown in FIG. 1 will be described. The wire electric discharge machining apparatus of the embodiment has at least a traveling apparatus 1, an automatic connection apparatus 2, a wire guide unit 3, a control device (not shown), a power supply apparatus (not shown), and a relative moving apparatus (not shown). An area in which the traveling apparatus 1, the automatic connection apparatus 2, the wire guide unit 3 and the relative moving apparatus are installed is referred to as a machine main body.

The traveling apparatus 1 is a means configured to supply a wire electrode WE that is not used and collect the wire electrode WE that is supplied and then used for machining. The traveling apparatus 1 includes a supply apparatus 11, a tension apparatus 12, a conveyance apparatus 13 and a collection apparatus 14.

The automatic connection apparatus 2 is a means configured to automatically stretch the wire electrode WE. The automatic connection apparatus 2 of the wire electric discharge machining apparatus of the embodiment includes a delivery roller 2A, a guide pipe 2B and a cutter 2C. The delivery roller 2A is a means configured to be rotated by a delivery motor 2M and to deliver the wire electrode WE. The guide pipe 2B is a means configured to guide a tip of the wire electrode WE to an upper wire guide unit 3A. The guide pipe 2B is included in a guide pipe holding box 2B1. A core collecting section 20 configured to collect a core WP1 that is cut out from a workpiece WP is installed on a sidewall of the guide pipe holding box 2B1. The cutter 2C is a means configured to cut the wire electrode WE. The cutter 2C may be replaced with a means configured to cut another wire electrode WE such as a heating roller that thermally cuts the wire electrode WE.

The wire guide unit 3 includes the upper wire guide unit 3A and a lower wire guide unit 3B. The upper wire guide unit 3A is an assembly obtained by integrating a wire guide 3A1 (a guide main body) configured to position and guide the wire electrode WE, a conductor 3A2 configured to supply electric power to the wire electrode WE, and a jet nozzle 3A3 configured to supply a jet flow of a working fluid in a downward direction coaxially with the wire electrode WE with respect to a machining gap GP between the workpiece WP and the core WP1 cut out from the workpiece WP. The lower wire guide unit 3B is an assembly obtained by integrating a wire guide 3B1 (a guide main body) configured to position and guide the wire electrode WE, and a jet nozzle 3B2 configured to supply a jet flow of a working fluid in an upward direction coaxially with the wire electrode WE with respect to the machining gap GP between a workpiece and a core cut out from the workpiece. A core holding pad 10, which will be described below, is installed on the lower wire guide unit 3B to surround the jet nozzle 3B2.

The control device (not shown) is a means configured to control an operation of the wire electric discharge machining apparatus. Signal lines are connected between the control device and the traveling apparatus 1, the automatic connection apparatus 2, a machining power supply apparatus or a relative movement apparatus, respectively, and a predetermined sequence operation is performed. The control device includes a numerical control device configured to perform specified operations on the traveling apparatus 1, the automatic connection apparatus 2, the machining power supply apparatus and the relative moving apparatus according to an NC program, and arbitrarily controls the entire operation of the wire electric discharge machining apparatus to execute desired machining.

The machining power supply apparatus is a means configured to continuously supply a discharge current pulse having a desired waveform and a peak current value to the machining gap GP. The relative moving apparatus is a means configured to relatively move the wire electrode WE and the workpiece WP in a horizontal two-axis direction. The relative moving apparatus includes a tapering apparatus that tilts the wire electrode WE and the workpiece WP.

An exhaust apparatus 4 is a means configured to collect a used wire electrode WE after being supplied and consumed for machining from a machining area. The exhaust apparatus 4 includes an idling roller 4A configured to convert an advance direction of the delivered wire electrode WE while applying an offset with respect to a delivery route of the wire electrode WE vertically stretched from the workpiece WP, a conveyance apparatus 4B configured to convey the wire electrode WE using a fluid, a winding roller 4C configured to wind the wire electrode WE, and a bucket 4D configured to collect the used wire electrode WE.

Next, the traveling apparatus 1 will be described in more detail. The supply apparatus 11 of the traveling apparatus 1 is a means configured to supply the wire electrode WE to the machining gap GP. The supply apparatus 11 includes a reel 11A, a wire bobbin 11B, a servo pulley 11F and a brake 11M. However, the wire bobbin 11B is an exchangeable consumable item that is wound and stored coaxially around the wire electrode WE having a predetermined length. The wire bobbin 11B is loaded into the reel 11A and rotated therewith.

The reel 11A is rotated according to a speed that the tension apparatus 12 continuously draws the wire electrode WE from the wire bobbin 11B. The brake 11M is, for example, a torque motor or a powder clutch. The brake 11M is installed to be directly connected to a rotary shaft of the reel 11A, and idle running of the wire bobbin 11B is obstructed by applying a load within a range in which the reel 11A is rotatable in a direction opposite to a rotational direction of the reel 11A. The servo pulley 11F moves upward and downward according to a variation of a tensile force of the wire electrode WE due to its own weight, and absorbs vibration of the wire electrode WE supplied due to the wire bobbin 11B and traveling.

The tension apparatus 12 is a means configured to feed the wire electrode WE from the wire bobbin 11B and sequentially deliver the wire electrode WE to the machining gap GP. In addition, the tension apparatus 12 is a means configured to apply a predetermined tensile force to the wire electrode WE supplied to the machining gap GP between the tension apparatus 12 and a collection apparatus 14. The tension apparatus 12 includes a drive roller 12A, a driven roller 12B, a pinch roller 12C and a servo motor 12M. A strain gauge 12T is a tensile force detector.

A limit switch 12L is a disconnection detector.

The drive roller 12A functions as both of a delivery roller configured to draw the wire electrode WE from the wire bobbin 11B and deliver the wire electrode WE to the machining gap GP, and a tension roller configured to apply a predetermined tensile force to the wire electrode WE. The wire electrode WE is wound by the driven roller 12B and the pinch roller 12C around about an outer circumference of the drive roller 12A. The drive roller 12A is rotated by the servo motor 12M. The control device controls a rotational speed of the servo motor 12M on the basis of the tensile force detected by the strain gauge 12T, and maintains a constant tensile force.

Here, in the embodiment, machining is performed by the core holding pad 10 installed on the lower wire guide unit 3B in a state in which the core WP1 can be held. Hereinafter, a configuration of the core holding pad 10 will be described in detail with respect to FIG. 2 and FIG. 3.

Figure 2:
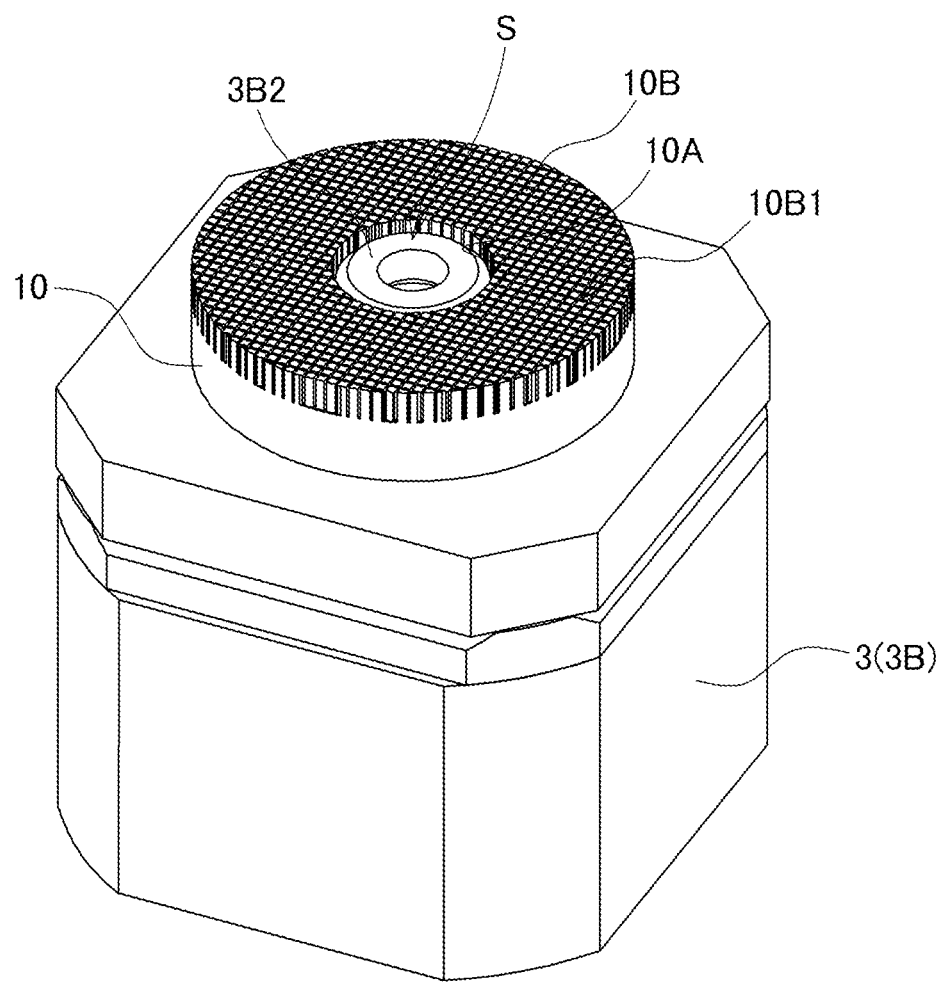
FIG. 2 is a perspective view of a lower wire guide unit on which a core holding pad is installed.
Figure 3:
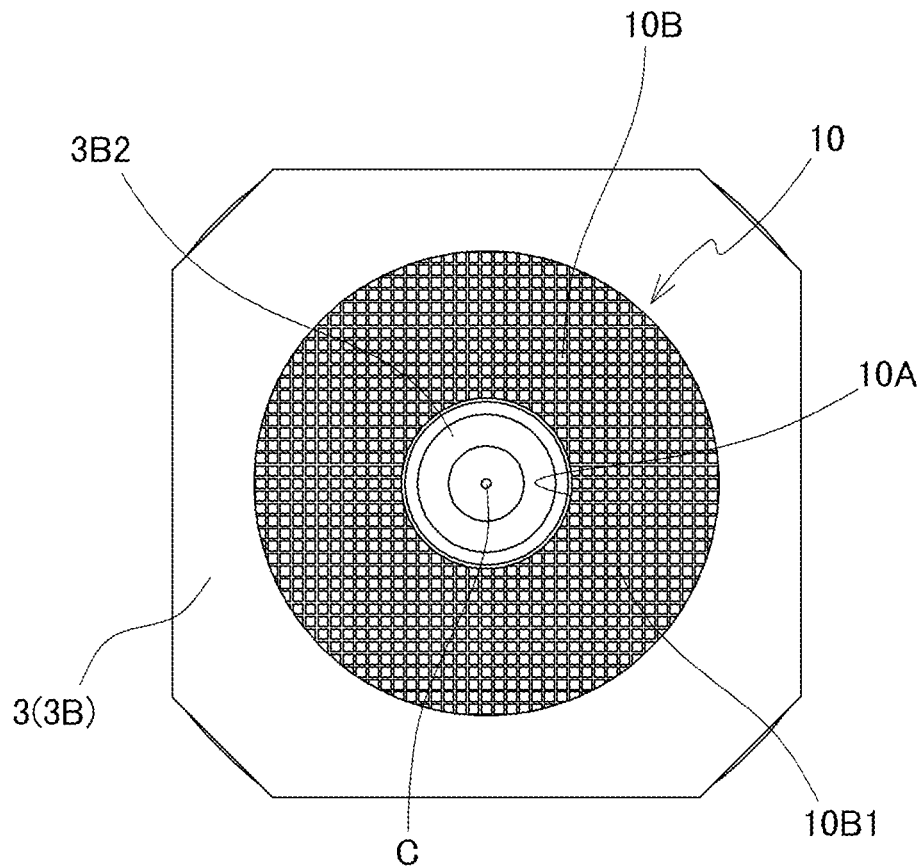
FIG. 3 is a plan view of the lower wire guide unit on which the core holding pad is installed.

As shown in FIG. 2, the core holding pad 10 has a substantially columnar shape in which a through-hole 10A in which the jet nozzle 3B2 is disposed at a central portion thereof is formed, when installed on the lower wire guide unit 3B. The core holding pad 10 is formed of, for example, a resin material. A plurality of protrusion sections 10B are formed on the entire region of an upper portion of the core holding pad 10. The plurality of protrusion sections 10B each have a quadrangular prismatic shape extending in an upward/downward direction, and are disposed in a lattice shape at predetermined intervals. Accordingly, as shown in FIG. 3, gaps 10B1 between the plurality of protrusion sections 10B are formed in a mesh shape of a net when seen in the upward/downward direction. A height of the plurality of protrusion sections 10B is, for example, 3 to 5 mm. The plurality of protrusion sections 10B have an equal distance from an upper surface thereof to a lower surface of the workpiece WP. That is, an upper surface of the core holding pad 10 is formed to be flush with a horizontal plane. The upper surfaces of the plurality of protrusion sections 10B are disposed at positions higher than an upper end of the jet nozzle 3B2. Accordingly, a jet flow supply space S surrounded by an inner wall of the core holding pad 10 is formed above the jet nozzle 3B2. In addition, an upper surface of the core holding pad 10 is disposed immediately below a center of gravity of a core WP1 until the core WP1 is separated from the workpiece WP and collected after cutting-out during cutting-out machining of the core WP1. In other words, the upper surface of the core holding pad 10 has an area such that a center of gravity of the core WP1 can be disposed immediately above the upper surface even when a relative position between the core holding pad 10 and the core WP1 varies during cutting-out machining of the core WP1. Accordingly, since the core WP1 can normally be held by the core holding pad 10, inclination and falling of the core WP1 can be prevented.

Next, an operation of the wire electric discharge machining apparatus of the embodiment shown in FIG. 2 and FIG. 3 during cutting-out of the core WP1 and separation and collection of the core WP1 from the workpiece WP will be described with reference to FIG. 4(a) to FIG. 4(d) and FIG. 5.

First, a cutting-out starting position is set to a center of gravity of the core WP1 that will be cut out, and the upper wire guide unit 3A and the lower wire guide unit 3B are moved to a position corresponding to the cutting-out starting position. Further, the jet nozzle 3B2 of the lower wire guide unit 3B and a center C of the through-hole 10A are disposed at the cutting-out starting position immediately below the center of gravity of the core WP1. In addition, the core holding pad 10 is disposed in a state in which the upper surface approaches a lower surface of the workpiece WP as closely as possible. More specifically, a distance between the upper surface of the core holding pad 10 and the lower surface of the workpiece WP is, for example, 10 to 100 μm.

Figure 4A:
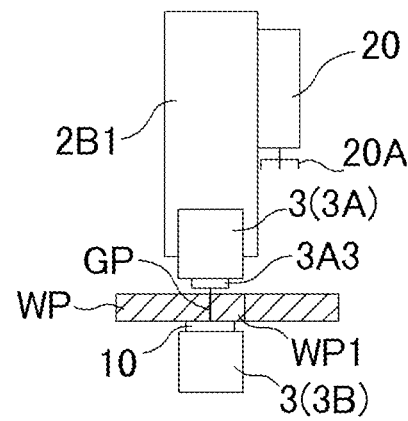
FIG. 4(a) to FIG. 4(d) are views showing an operation until a core is cut out, and the core is separated from a workpiece and collected.

Next, as shown in FIG. 4(a), when the workpiece WP is moved in a horizontal direction, cutting-out machining of the core WP1 is performed. Upon cutting-out machining, in order to remove machining chips generated during machining, jet flows having a uniform pressure are continuously injected from the jet nozzle 3A3 of the upper wire guide unit 3A and the jet nozzle 3B2 of the lower wire guide unit 3B to upper and lower surfaces of the workpiece WP. Here, the jet flow injected from the jet nozzle 3B2 of the lower wire guide unit 3B to the workpiece WP is discharged from the jet flow supply space S via the gap 10B1 between the plurality of protrusion sections 10B of the core holding pad 10. Accordingly, an excessive increase in pressure in the jet flow supply space S having an upper side closed by the workpiece WP and the core WP1 can be prevented using a relatively simple configuration in which there is no driving apparatus that can easily malfunction in the working fluid, and the jet pressure can be adjusted to have an appropriate value. Accordingly, during cutting-out machining, since a jet flow having a desired pressure can be sent to the machining gap GP between the workpiece WP and the core WP1, it is possible to prevent occurrence of a problems such as vibration of the wire electrode WE due to an excessive increase in jet pressure or handling of the machining chip not being possible due to an excessive decrease in jet pressure, and accurately perform cutting-out of the core WP1.

Further, since the workpiece WP and the core WP1 are not connected to each other during cutting-out machining, inclination of the core WP1 does not typically occur. However, for example, when the mass of the core WP1 is large, a connecting section may not be able to withstand the weight, and slight inclination may occur even during machining.

In the embodiment, the upper surface of the core holding pad 10 and the lower surface of the workpiece WP are disposed to approach each other as close to as possible. Accordingly, since the core WP1 can be held by the core holding pad 10, occurrence of slight inclination occurred in the above-mentioned case can be prevented, and a decrease in machining accuracy can be prevented. In addition, like upon termination of cutting-out or immediately after termination of cutting-out in which a burden of the connecting portion is large and inclination easily occurs, since the core WP1 can be held by the core holding pad 10, occurrence of inclination can be prevented.

In addition, since the upper surfaces of the plurality of protrusion sections 10B are disposed at positions higher than the upper end of the jet nozzle 3B2, contact of the jet nozzle 3B2 with the workpiece WP and the core WP1 during cutting-out can be prevented, and damage to the jet nozzle 3B2 can be prevented. In addition, damage to the jet nozzle 3B2 due to falling of the core WP1 after cutting-out can be prevented.

Figure 4B:
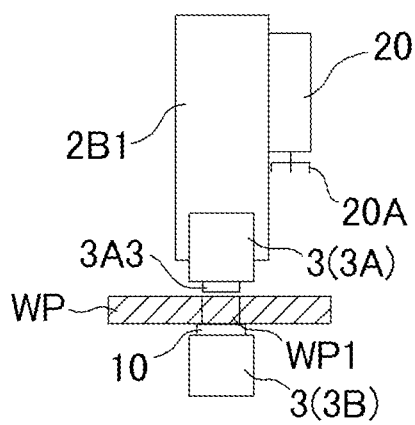

After termination of cutting-out of the core WP1, as shown in FIG. 4(b), the wire electrode WE is cut. Then, the upper wire guide unit 3A and the lower wire guide unit 3B are moved to positions corresponding to the cutting-out starting position while continuously injecting a jet flow having a uniform pressure to the upper and lower surfaces of the core WP1 from the jet nozzles 3A3 and 3B2 installed on the upper wire guide unit 3A and the lower wire guide unit 3B. In this way, since the jet flow having a uniform pressure is injected to be inserted from the upward/downward direction to maintain a balance of the core WP1, inclination of the core WP1 generated during movement of the upper wire guide unit 3A and the lower wire guide unit 3B can be prevented. Further, since a thin liquid film of the working fluid is provided between the upper surface of the core holding pad 10 and the lower surface of the core WP1 when a jet flow escapes entirely evenly from the gaps 10B1 between the numerous protrusion sections 10B of the core holding pad 10, the core holding pad 10 can be protected. Accordingly, damage to the core holding pad 10 due to a contact with the core WP1 can be prevented. In addition, catching of the core WP1 when the core WP1 is separated from the workpiece WP, which will be described below, can be prevented.

Figure 4C:
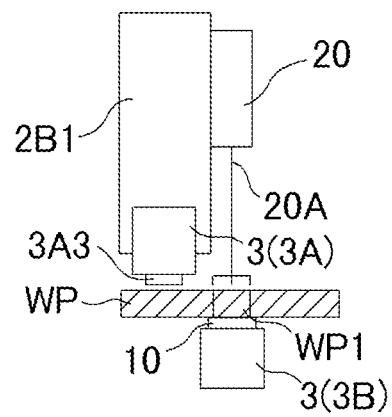

After the upper wire guide unit 3A and the lower wire guide unit 3B are moved to the cutting-out starting position, as shown in FIG. 4(c), a vertical jet flow is stopped and a retreat position of the upper wire guide unit 3A is moved to. Then, a core collecting arm 20A of the core collecting section 20 is lowered to a position at which the core WP1 can be captured. Further, the retreat position is a position at which the upper wire guide unit 3A is disposed further outward than the core WP1 when seen in the upward/downward direction.

Figure 4D:
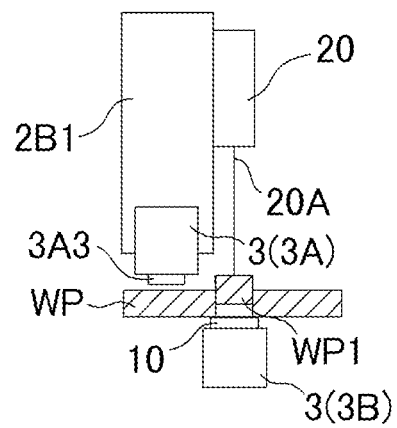
Figure 5:
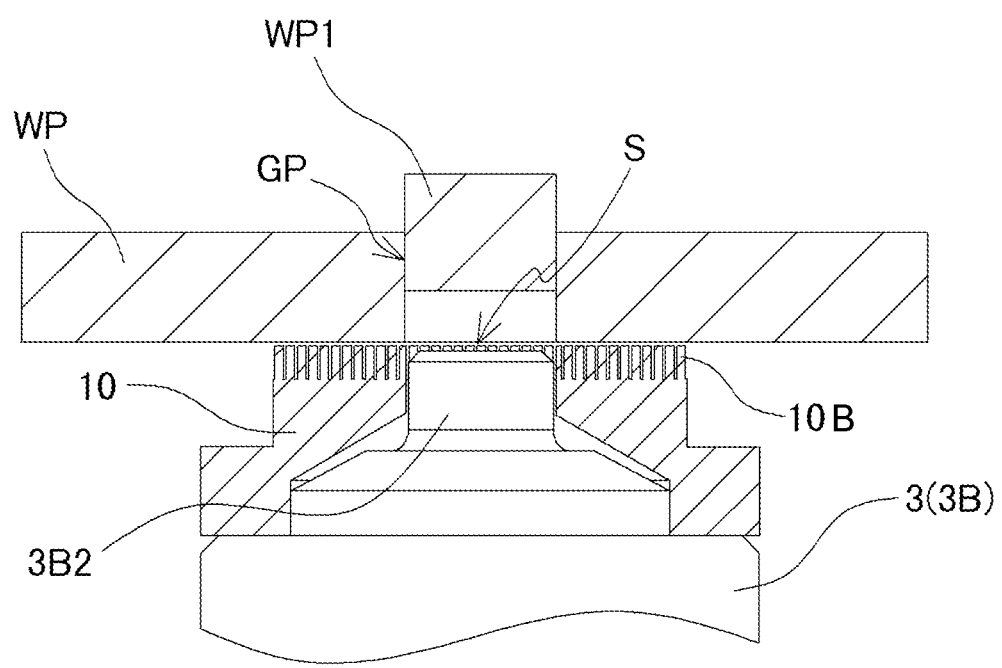
FIG. 5 is a cross-sectional view of the lower wire guide unit on which the core holding pad is installed when a core is separated from a workpiece.

As shown in FIG. 4(d) and FIG. 5, a jet flow is injected again from the jet nozzle 3B2 of the lower wire guide unit 3B toward a center of gravity of the core WP1, the core WP1 is pushed up by the jet pressure. In this way, since a jet flow is injected to a center of gravity of the core WP1 in a state in which the lower surface of the cut-out core WP1 is horizontally held by the upper surface of the core holding pad 10, the core WP1 can be smoothly pushed up without losing a balance even in a jet flow only in a downward direction. After that, the core WP1 pushed up to a predetermined height is captured and collected by the core collecting arm 20A.

Hereinabove, while an appropriate embodiment of the disclosure has been described, the disclosure is not limited to the embodiment or examples, and various design changes may be made without departing from the spirit of the claims.

While the cutting-out starting position has been described as being set to a center of gravity of the core WP1 on which cutting-out is performed in the embodiment, the machining starting position may be set to an arbitrary place. In this case, when the core WP1 is separated from the workpiece WP, the center C of the jet nozzle 3B2 of the lower wire guide unit 3B is disposed immediately under the center of gravity of the core WP1 such that a jet flow can be injected toward the center of gravity of the core WP1.

In addition, when seen in the upward/downward direction, while the plurality of protrusion sections 10B each may have a quadrangular prism shape extending in the upward/downward direction and be disposed in a lattice shape at predetermined intervals, as long as intervals 10B1 between a protrusion section 10B and a protrusion section 10B are uniformly disposed around the through-hole 10A formed at substantially the center C of the core holding pad 10 in the upward/downward direction such that the jet flow can be unformed discharged outward, the plurality of protrusion sections 10B may have any shape and arrangement.

Figure 6:
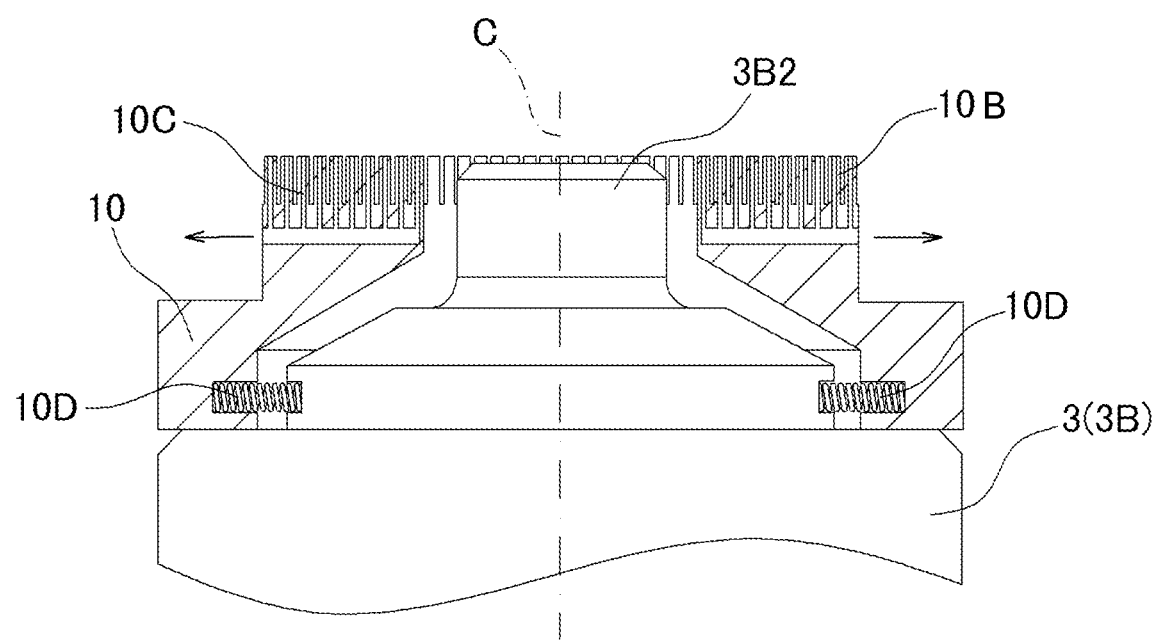
FIG. 6 is a cross-sectional view of a lower wire guide unit on which a variant of a core holding pad is installed.

In addition, as shown in FIG. 6, the plurality of protrusion sections 10B can be used as suction nozzles. The suction nozzles may be constituted by, for example, forming suction holes 10C in the protrusion sections 10B and connecting the suction holes 10C and the suction apparatus (not shown). Accordingly, since the core WP1 and the core holding pad 10 can be fixed by suctioning from the suction holes in a direction shown by an arrow, in comparison with the case in which only the lower surface of the core WP1 is held by the core holding pad 10, the lower surface of the core WP1 can be more securely held in a horizontal direction. Accordingly, inclination of the core WP1 generated when the core WP1 falls out from the workpiece WP can be more securely prevented.

In addition, in addition to the fact that the plurality of protrusion sections 10B may be used as suction nozzles, a simple sliding mechanism may be installed between the core holding pad 10 and the lower wire guide unit 3B. The sliding mechanism may include, for example, as shown in FIG. 6, a pair of spring members 10D configured to connect the core holding pad 10 to the lower wire guide unit 3B. The pair of spring members 10D are elastically inserted and fixed into groove sections formed in the core holding pad 10 and the lower wire guide unit 3B, respectively. The pair of spring members 10D are disposed to be elastic in a single axial direction in which the center C of the through-hole 10A and the two spring members 10D are connected. Accordingly, in a straight line direction in which the pair of spring members 10D are connected, the core holding pad 10 is movable relatively with respect to the lower wire guide unit 3B in a horizontal direction. Accordingly, when the core WP1 is cut off from the workpiece WP at the end of the cutting-out machining, the core holding pad 10 and the workpiece WP can be moved in a horizontal direction independently from the upper wire guide unit 3A and the lower wire guide unit 3B, through which the wire electrode WE is inserted, while suctioning the core WP1 using the suction nozzles and firmly fixing a relative position between the core WP1 and the workpiece WP. Accordingly, the wire electrode WE is inserted into the machining gap GP by moving only the core WP1 in the horizontal direction, and it is possible to prevent the problem that the wire electrode WE does not advance, or the wire electrode WE being disconnected. Further, the pair of spring members 10D may be provided in plural.

In addition, while the case in which one core WP1 is cut out has been described, the disclosure may be applied to multi-piece machining in which a plurality of cores are cut out of one workpiece.

In addition, while the case in which the core holding pad 10 is installed on the lower wire guide unit 3B only has been described, like the lower wire guide unit 3B, the core holding pad 10 may also be installed on the upper wire guide unit 3A. Accordingly, it is possible to suction the upper and lower surfaces of the core WP1 using the plurality of protrusion sections 10B formed on the core holding pad 10 installed on the upper wire guide unit 3A and the lower wire guide unit 3B and fix the core WP1 while being inserted from above and below, when the core WP1 falls out.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wire electric discharge machining apparatus for pushing up a core cut out of a workpiece through wire electric discharge machining using a jet pressure of a jet flow and separating the core from the workpiece, the wire electric discharge machining apparatus comprising:

an upper wire guide unit and a lower wire guide unit including wire guides installed above and below with the workpiece sandwiched therebetween and configured to position and guide a wire electrode, and a jet nozzle being configured to supply a jet flow of a working fluid coaxially with the wire electrode; and a core holding pad in which a through-hole passing therethrough in an upward/downward direction, a plurality of protrusion sections having an equal distance from upper surfaces thereof to a lower surface of the workpiece, and gaps between the plurality of protrusion sections are formed, and the core holding pad has an upper surface and an outer lateral surface opened through the gaps between the plurality of protrusion sections and connected to the through-hole, wherein the core holding pad is disposed on the lower wire guide unit such that the jet nozzle is disposed in the through-hole and the core holding pad approaches the lower surface of the workpiece as closely as possible to hold a lower surface of the core cut out of the workpiece, and a working fluid injected during cutting-out and after cutting-out is discharged from the through-hole through the gaps between the plurality of protrusion sections toward the upper surface side and the outer lateral surface side.

2. The wire electric discharge machining apparatus according to claim 1, wherein an upper surface of the core holding pad is disposed immediately below a center of gravity of the core during cutting-out and after cutting-out of the core.

3. The wire electric discharge machining apparatus according to claim 1, wherein, after the core is cut out, the lower wire guide unit injects a working fluid from the jet nozzle toward a center of gravity of the core, and pushes the core out of the workpiece to separate them.

4. The wire electric discharge machining apparatus according to claim 1, wherein an upper surface of the core holding pad is disposed at a position higher than a height of an upper end of the jet nozzle.

5. The wire electric discharge machining apparatus according to claim 1, wherein the plurality of protrusion sections comprise suction nozzles, and when the core falls out upon termination of cutting-out of the core, the plurality of protrusion sections suction a lower surface of the core and fix the core holding pad and the core.

6. The wire electric discharge machining apparatus according to claim 5, wherein the core holding pad has a sliding mechanism that is relatively movable with respect to the lower wire guide unit in a horizontal direction.

7. The wire electric discharge machining apparatus according to claim 5, further comprising: the core holding pad installed on the upper wire guide unit, wherein, when the core falls out, the plurality of protrusion sections formed on the core holding pad installed on the upper wire guide unit suction the upper surface of the core and fix the core holding pad and the core.

8. A wire electric discharge machining method using a wire electric discharge machining apparatus characterized in that:

the wire electric discharge machining apparatus comprising:

an upper wire guide unit and a lower wire guide unit including wire guides installed above and below with the workpiece sandwiched therebetween and configured to position and guide a wire electrode, and a jet nozzle being configured to supply a jet flow of a working fluid coaxially with the wire electrode; and a core holding pad, the core holding pad has a through-hole passing therethrough in an upward/downward direction, a plurality of protrusion sections having an equal distance from upper surfaces thereof to a lower surface of the workpiece, and gaps between the plurality of protrusion sections, and the core holding pad has an upper surface and an outer lateral surface opened through the gaps between the plurality of protrusion sections and connected to the through-hole, wherein the core holding pad is disposed on the lower wire guide unit such that the jet nozzle is disposed in the through-hole and the core holding pad approaches the lower surface of the workpiece as closely as possible to hold a lower surface of the core cut out of the workpiece, during cutting-out machining, injecting the working fluid from the jet nozzle of the lower wire guide unit toward a machining gap and discharging the working fluid from the through-hole through the gaps between the plurality of protrusion sections toward the upper surface side and the outer lateral surface side of the core holding pad, after termination of cutting-out, injecting again the working fluid from the jet nozzle of the lower wire guide unit toward a center of gravity of the core, pushing up the core in a state in which the lower surface of the core is horizontally held by the upper surface of the core holding pad by the jet pressure of the working fluid, and discharging the working fluid from the through-hole through the gaps between the plurality of protrusion sections toward the upper surface side and the outer lateral surface side of the core holding pad.

9. The wire electric discharge machining method according to claim 8, after termination of cutting-out, injecting the working fluid having a uniform pressure to the upper surface and the lower surface of the core from the jet nozzle of the upper wire guide unit and the jet nozzle of the lower wire guide unit while moving the upper wire guide unit and the lower wire guide unit to the center of gravity of the core.

* * * * *